May 5, 1970    W. A. BURTIS    3,510,101
HIGH-PRESSURE VALVE
Filed Feb. 16, 1967    3 Sheets-Sheet 1
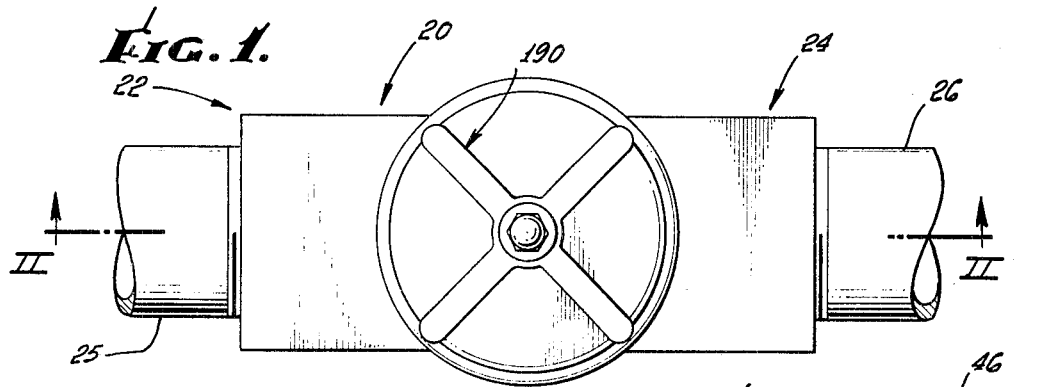
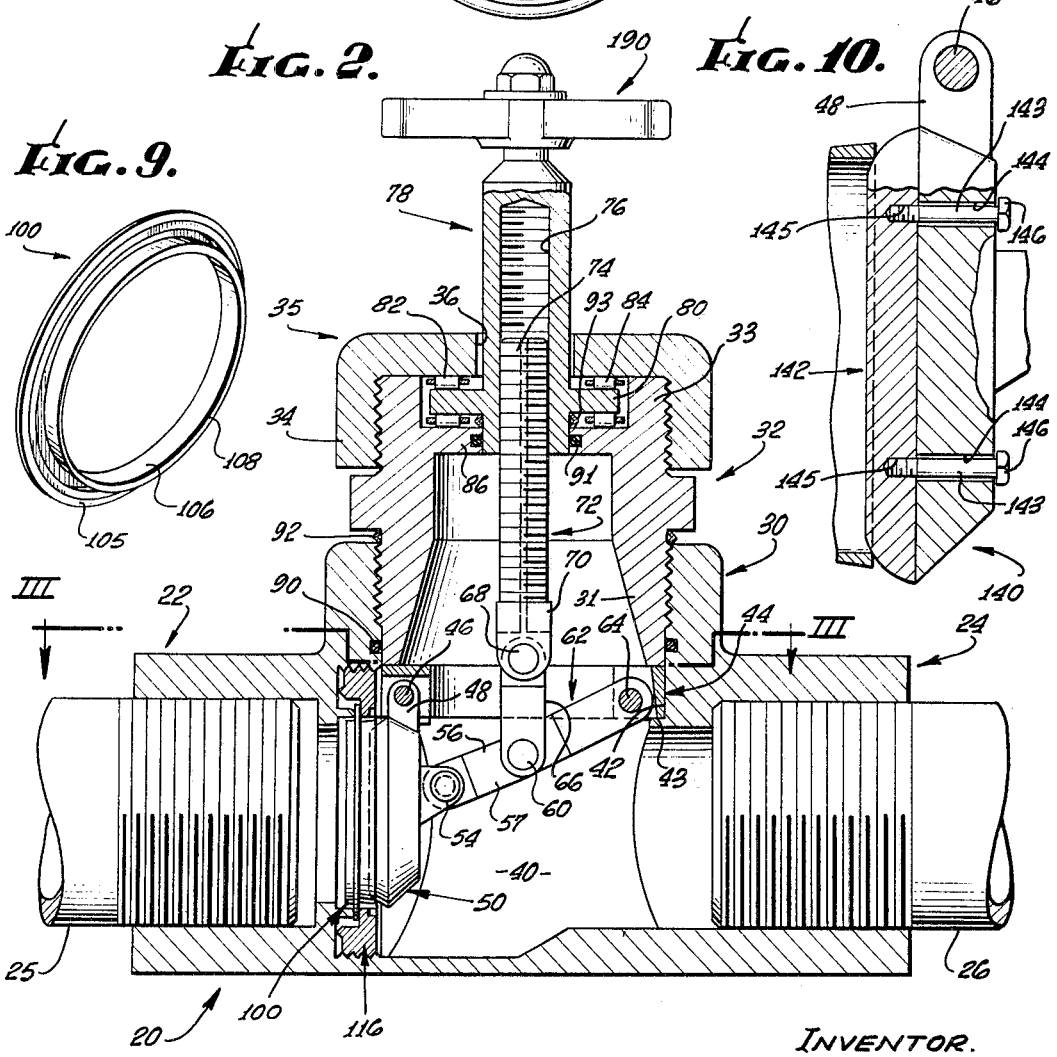
INVENTOR.
WILSON A. BURTIS
By Miketta, Glenny, Poms & Smith
ATTORNEYS.

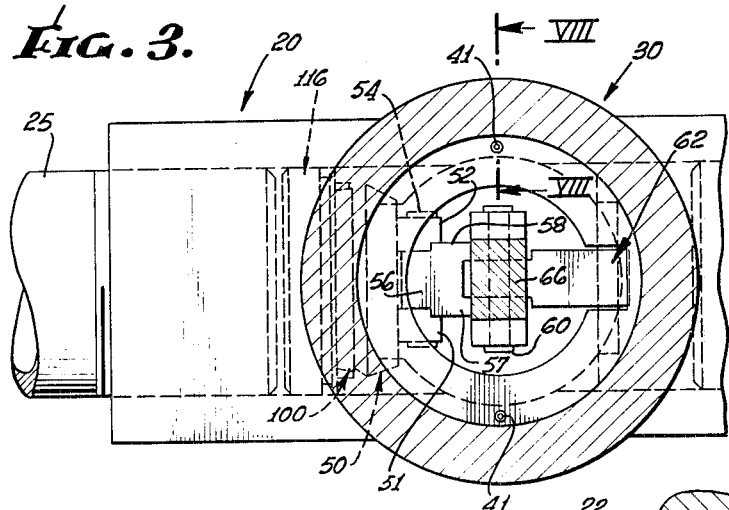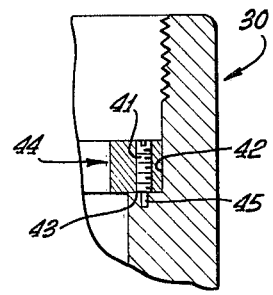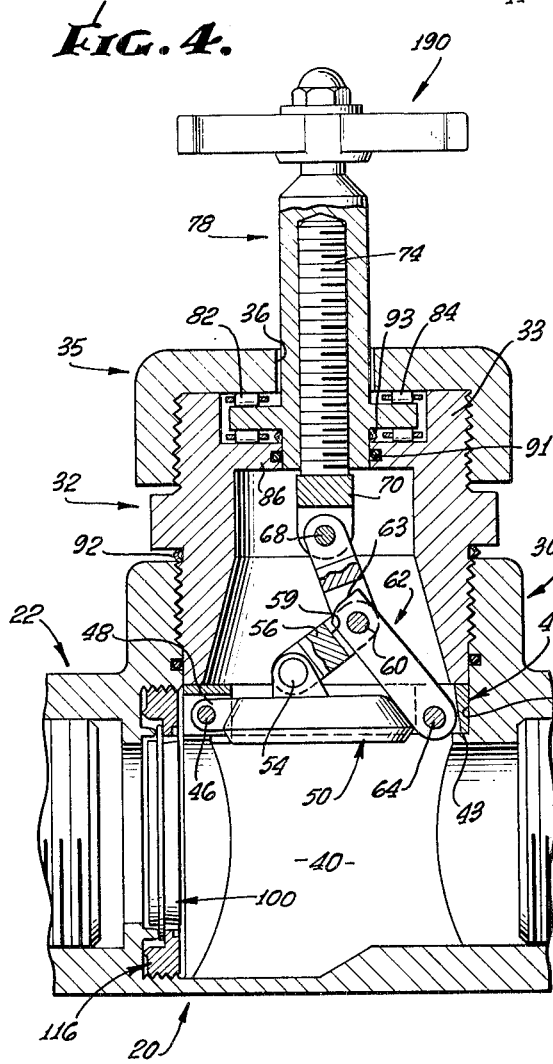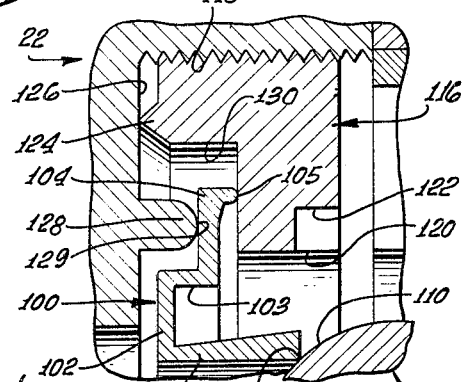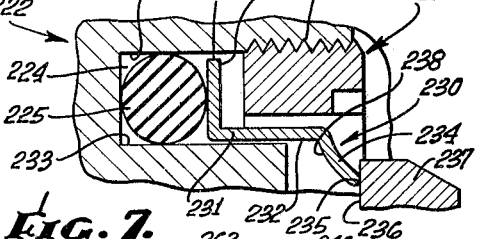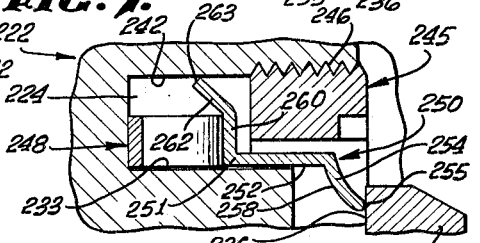
INVENTOR.
WILSON A. BURTIS
By Mikelle, Glenny, Pomi & Smith
ATTORNEYS.

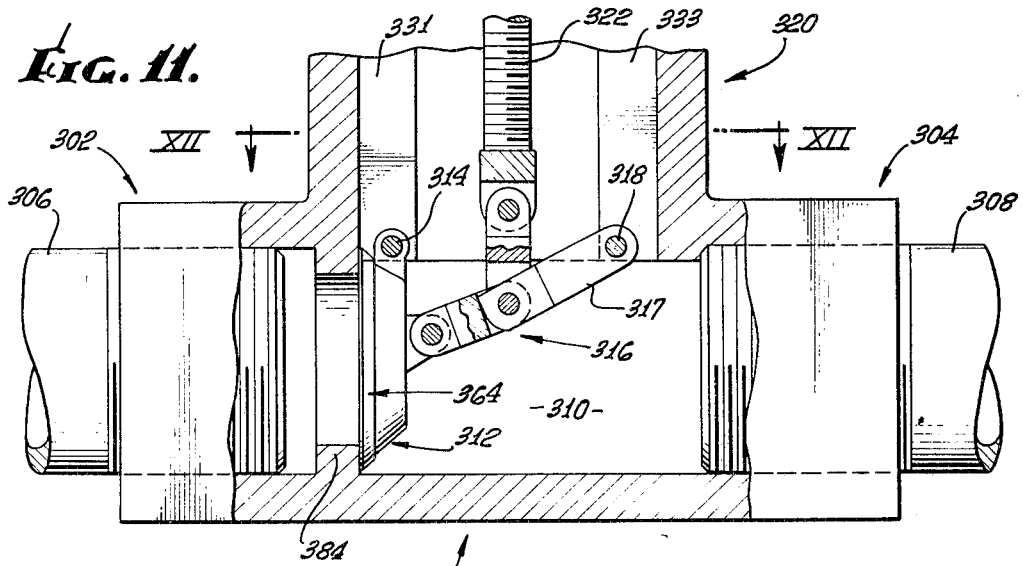
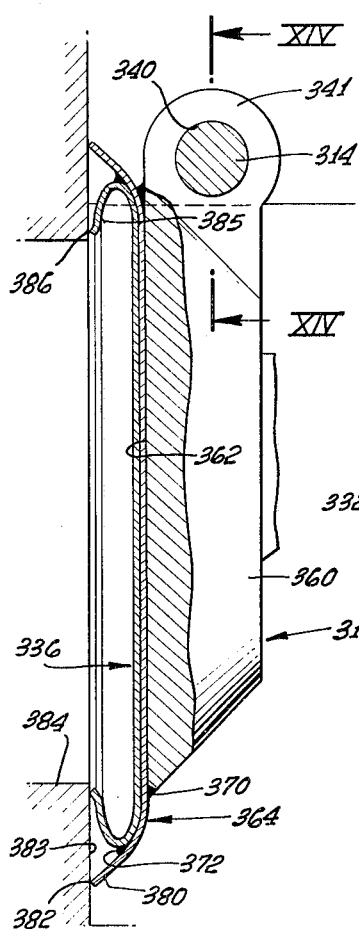
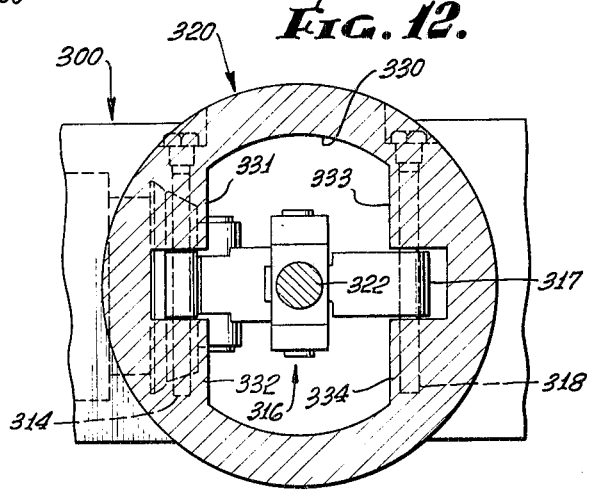
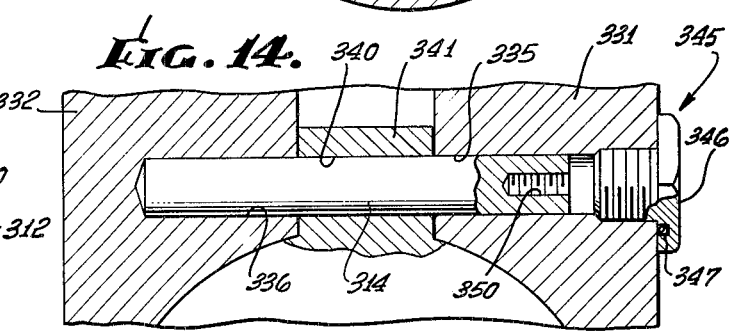

3,510,101
HIGH-PRESSURE VALVE
Wilson A. Burtis, 5011 Harvard Ave.,
Westminster, Calif. 92683
Filed Feb. 16, 1967, Ser. No. 616,595
Int. Cl. F16k 25/00, 31/52
U.S. Cl. 251—228      2 Claims

ABSTRACT OF THE DISCLOSURE

A valve with a flapper closure member pivoted about an axis outside the fluid flow path and actuated by a toggle linkage having limit stop means approximately at over-center relation, corresponding to valve closed position. Sealing contact is metal-to-metal, with valve seat and closure member permitted limited relative movement radially and axially of the valve axis in sealing relation. In open position the closure member is retracted out of the fluid flow path. Arrangement facilitates disassembly of valve parts without disconnecting valve body from adjacent conduits.

BACKGROUND OF THE INVENTION

The present invention pertains to the field of valves for controlling flow of fluid under pressures of 4,000 p.s.i. or more and more particularly to such a valve in environments in which temperature variations may cause unequal or irregular expansion and contraction of the parts, which can create leakage conditions with conventional valves. The closure member in the present valve is moved between open and closed positions by actuating means including a toggle linkage having limit stop means to insure that the linkage is at or slightly beyond over-center position when the closure member is in closed position, the closure member and mating valve seat having at least some relative movability when the closure member is at or approaching closed position. In many applications it is difficult and sometimes impossible to remove the valve from the conduits connected to it, and periodic servicing and repair of the components of the valve may therefore present a serious problem. The present valve provides means permitting disassembly and replacement of component parts without disturbing the connections between the valve body and conduits.

SUMMARY OF THE INVENTION

The invention contemplates the provision of a longitudinally extending body having a generally cylindrical passageway extending axially therethrough between inlet and outlet ends. A valve seat is mounted in the body, including an annular sealing portion which is generally concentric with the body passageway. In a preferred form of the invention, the sealing portion is desirably formed as a lip of relatively thin generally cylindrical material, preferably metal, directed downstream of the body. The valve comprises also a pivotally mounted closure member including a sealing face which desirably constitutes a surface of revolution about an axis which, when the closure member is in closed position, is concentric with the valve seat. Means are provided for actuating the closure member into, selectively, open or closed positions, as well as any intermediate position if so desired, such actuating means including in the present embodiment a toggle or over-center linkage whereby very high mechanical advantage is available for forcing the closure member into final sealing contact with the valve seat, the mechanical advantage approaching infinity at closure. Such toggle means are advantageous also in insuring that there is no permanent deformation or other damage to the valve seat or to the closure member if the actuating means is permitted to slightly over-run its designed closed position. The valve seat proper is desirably mounted in the body in such a way as to permit at least some shiftability as a unit, either radially or axially or both, relative to the axis of the valve body.

In another embodiment of the invention, the seat may constitute an annular shoulder formed in the valve body, and the closure member may be provided with a sealing element in the form of a generally circular piece of sheet metal such as stainless steel having a thickness of from about 0.010 to about 0.015 inch, the sealing element being rigidly attached to the closure member by suitable means, preferably by welding of the sealing element to the closure member. The outer edge of such a sealing element includes a bellows-like configuration terminating in a circular sealing edge for contacting the seat, the sealing edge having a diameter substantially less than the maximum diameter of the bellows sealing element. By this means, high-pressure fluid upstream of the valve tends to increase the force by which the sealing element is urged into sealing contact with the seat. In order to provide for sealing against pressure fluid in either direction of the valve, there may also be provided in this embodiment an additional sealing element, generally circular in shape and consisting of sheet metal such as stainless steel of the approximate thickness above suggested. This secondary sealing element is also mounted on the closure member by suitable means such as the welding means above suggested for the primary sealing element. The two generally circular sealing elements are mounted concentrically upon the closure member. In the case of the use of the secondary sealing element, its edge sealingly contacts the valve seat at such an angle, as will be later understood, as to derive increased sealing force from the pressure of fluid in the direction through the present valve opposite to that for which the valve is primarily designed.

The present invention also includes means for facilitating removal of the component parts of the valve for periodic maintenance, replacement or the like. One form of the invention permitting such removal contemplate the provision of a mounting ring received in the valve body and disposed in a plane parallel to the longitudinal axis of the body and displaced from that axis by a distance at least equal to, and preferably somewhat greater than, the radius of the generally cylindrical passageway through the body. The valve closure member is pivotally attached to the mounting ring by a pivot pin extending transversely of the longitudinal axis of the valve body and so disposed that, when the valve closure member is withdrawn to fully opened position, the longitudinal passageway of the valve body is virtually completely unobstructed by the closure member. The mounting ring provides also a pivotal mounting for one arm of the toggle linkage assembly by which the closure member is moved between opened and closed positions.

The mounting ring construction just described is particularly desirable for relatively small valves. In the case of valves having large enough dimensions to permit the operator to insert his fingers and hand for disassembly and assembly operations, the mounting ring need not be used, and the pivot pins just mentioned may instead be carried on the valve body itself.

When the valve seat and the sealing face of the closure member are made of metal, as is preferred, it will be seen that a tight, metal-to-metal line of contact is established when the valve is in closed position.

Although the embodiments of the invention herein illustratively disclosed contemplate manual actuation, it will be evident that actuation of the valve may be accomplished by suitable power means such as hydraulic, electric or the like.

Accordingly, it is a principal object of the present invention to provide and disclose a novel valve particularly well suited for use with fluids under high pressures. Other objects and purposes of the invention are to provide, in such a valve, a closure member hingedly mounted on the valve body so that, in its open position, it is withdrawn from the path of fluid flow through the valve, thereby minimizing pressure drop; therethrough to provide, in such a valve, actuating means for supplying closing force with very high mechanical advantage at and near the moment of closure; to provide in such a valve an annular valve seat so mounted as to permit limited radial shiftability in a plane transverse to the valve axis; to provide, in such constructions means for facilitating disassembly and assembly of the component parts without disassembling the valve body from the conduit to which it is connected; and for other and additional purposes as will be understood from the following description of preferred embodiments of the invention taken in connection with the accompanying drawings in which:

FIG. 1 is a top plan view of a preferred form of the present valve, connected to two pipes fragmentarily shown.

FIG. 2 is a longitudinally sectional view taken on line II—II of FIG. 1, with the valve in closed position.

FIG. 3 is a sectional view looking downwardly along the broken line III—III of FIG. 2.

FIG. 4 is a sectional view similar to FIG. 2, but showing the valve in open position.

FIG. 5 is a fragmentary sectional view on an enlarged scale of a portion of FIG. 2, showing details of the mounting of one form of valve seat and its line of sealing contact with the closure member.

FIG. 6 is a fragmentary sectional view on the same scale as FIG. 5, showing details of an alternative form of valve seat in sealing engagement with a closure member.

FIG. 7 is a fragmentary sectional view similar to FIG. 6, showing details of still another alternative form of seal.

FIG. 8 is a fragmentary sectional view taken on line VIII—VIII of FIG. 3, showing details of one form of positioning means for the mounting ring in the valve body.

FIG. 9 is a perspective view of the valve seat shown in FIGS. 2, 4, and 5.

FIG. 10 is a fragmentary sectional view of an alternative form of closure member, wherein the sealing portion of the closure member is permitted a limited amount of shiftability, both radially and axially.

FIG. 11 is a longitudinal sectional view of another form of valve in accordance with the present invention, the valve being shown in closed position.

FIG. 12 is a sectional view looking downwardly on the arrows XII—XII of FIG. 11.

FIG. 13 is a sectional view on an enlarged scale of the closure member and seat of the valve of FIG. 11.

FIG. 14 is a fragmentary sectional view taken on line XIV—XIV of FIG. 13.

Referring now in detail to the drawings, and first to FIGS. 1 and 2 thereof, a preferred form of the valve of the present invention includes a generally longitudinally extending body indicated generally at 20 having an axial passageway therethrough from an inlet or high pressure end indicated generally at 22, to an outlet or low pressure end indicated generally at 24. Each of the inlet and outlet ends may be internally threaded for connection to an inlet conduit 25 and an outlet conduit 26 respectively. Body 20 also includes an upwardly extending, internally threaded boss indicated generally at 30, into which is threadedly connected the lower end 31 of a retaining nut indicated generally at 32, whose upper end 22 is threadedly connected to the skirt 34 of a cap indicated generally at 35, centrally apertured at 36.

Valve body 20 includes, intermediate its length, an internal chamber indicated generally at 40 in axial alignment with inlet and outlet ends 22 and 24. Within chamber 40, the valve closure member of the present invention is pivotable between its closed position of FIG. 2 and its open position of FIG. 4, as will be later described in detail.

Immediately above chamber 40, the valve body 20 is provided with a circular bore 42 whose lower extent is defined by shoulder 43, and within this bore there is received a mounting ring indicated generally at 44. Means are provided for positioning the ring 44 in bore 42, here shown as including (see FIGS. 3 and 8) dowel members 41 threadedly carried by ring 44 and provided with lower extension shank pins 45 received in bores formed in shoulder 43. At its upstream side ring 44 provides means for mounting a transversely extending pivot pin 46, to which is journaled an extension arm 48 of valve closure member indicated generally at 50. Extending rearwardly, from closure member 50 there may be provided a pair of lugs or ears 51, 52 (see FIG. 3) journaling there between a pin 54, to the central portion of which is pivotally attached the lower end of a link arm 56. The upper end of arm 56 is provided with bifurcations 57, 58 on either side of a central shoulder 59. The outer ends of the bifurcations are provided with a pivot pin 60. Another link arm indicated generally at 62 is pivotally connected at its one end to the pivot pin 60, and at its other end is pivotally connected to the pin 64, which is in turn carried by mounting ring 44. Another arm 66 extends upwardly from its pivotal connection to pin 60, and at its upper end is connected through pivot pin 68 to a clevis 70 carried at the lower end of a rod indicated generally at 72, having an upper threaded portion 74 in engagement with an internally threaded bore 76 of a control handle indicated generally at 78. The latter member is provided, near its lower end, with an enlarged flange 80 which is journaled by means of thrust bearings 82, 84, between cap 34 and shoulder 86 of retaining nut 32.

In order to insure hermetic sealing of the various components, there are desirably provided seals in the form of O-ring 90 in an internal annular recess of boss 30, and an O-ring 91 in an annular recess of the shoulder 86 of retainer nut 32. Alternatively, or in addition, there may also be provided metal seals 92 and 93, desirably of V or Chevron section, sealing against escape of pressure fluid from chamber 40.

It is to be noted that pivot pins 46, 54, 60, 64 and 68 are all disposed so that their axes are parallel and extend transversely of the axis of the longitudinal valve body 20.

It will now be understood that, when control member 78 is rotated by means of the handle indicated generally at 90, the threaded portion 74 of rod 72 will be moved vertically, and will, through the linkage above described, cause the valve closure member 50 to be moved between its opened position seen in FIG. 4, and its closed position seen in FIG. 2. It is particularly to be noted, with reference to FIG. 2, that the downward movement of rod 72 and its associated linkage, will provide an increasingly large mechanical advantage as the valve closure member 50 is moved into its closed position seen in FIG. 2. The outermost end 63 of arm 62 abuts shoulder 59 of link when the parts are in the position shown in FIG. 2, with the toggle linkage at or slightly past the point of maximum extensibility, and the valve in closed position.

In FIG. 9 there is indicated generally at 100 the annular valve seat of the valve of FIGS. 2 and 4, and the mounting of the seat will be understood by reference to the enlarged showing of FIG. 5. Thus, seat 100 includes a generally radially extending base 102, an offset portion 103 outwardly of the base, and a generally radially disposed rim 104 provided with a lip 105 projecting downstream of the valve. Inwardly of base 102 is an annular skirt 106 extending downstream from base 102 and terminating downstream in a sealing edge 108. This sealing edge makes sealing contact with the closure member 50, and particularly with its annular sealing portion 110, which is a surface of revolution whose contour, as seen in section, is divergent downstream and in the present embodiment is convex.

Valve seat 100 is retained in its position seen in FIGS. 4 and 5 by suitable means, here shown as including a retainer nut indicated generally at 116, threadedly received in an internally threaded bore 118 of valve body 22. Retainer nut 116 has a central bore 120 having a larger inside diameter than the diameter of skirt 106 of the valve seat, and hence lying out of the path of fluid flow through the present valve when the closure member is open. The inside diameter 120 of the retainer nut may be provided with a number of arcuately spaced notches, one of which is seen at 122, to permit rotation of the retainer nut in and out of position by suitable tool such as spanner wrench. Retainer nut 116 is further provided on its inner face, with a relatively sharp annular lip 124, making tight sealing contact with the annular shoulder 126 of the valve body 22 when the retainer nut is in its position seen in FIG. 5. Radially inwardly of the annular shoulder 126, valve body 22 may be provided with an annular projection 128, terminating in an outer rounded contour 129, bearing against the portion 104 of the valve seat.

It is to be noted that retainer nut 116 is provided with a counterbore 130 spaced radially outwardly of the valve seat 100, whereby to permit radial shiftability of the valve seat within the cavity defined by the portions of the valve body just referred to and the retainer nut 116. It will accordingly be understood that, when the closure member 50 is moved into sealing engagement with the valve seat 100, and more particularly with the sealing edge 108 of the valve seat, the valve seat is permitted sufficient radial movement in order to equalize the sealing pressure between the sealing edge 108 and the surface 110 of the closure member, and in this manner to compensate for any changes of dimension of the parts incident to expansion or contraction caused by temperature or the like. When the force of high-pressure fluid is exerted rightwardly as seen in FIGS. 2 and 5, skirt 106 may expand somewhat, within its elastic limit, which will permit downstream movement of the line of sealing contact 108 along the smooth divergent surface 110. Furthermore, the portions of valve seat 100 radially inwardly of projection 128 are permitted slight axial movement about annular line 129 as a fulcrum, by reason of the flexibility of the valve seat and particularly base 102 and offset portion 103 thereof.

The construction of FIG. 10 permits even more shiftability between the closure member and the valve seat at or approximately at the moment of closure. Thus the closure means there shown includes a carrier member indicated generally at 140, which is connected, as in the case of closure member 50 previously described, by means of an extension 48 to the pivot pin 46. Carrier 140 has attached thereto a closure member proper, indicated generally at 142, and mounted to the carrier 140 by means permitting some relative movement of the closure member 142. In the present illustrative embodiment of the invention, such mounting means include a number of arcuately spaced bolts, two of which are seen at 143, each extending through bores 144 formed in the carrier 140 and threadedly received in threaded bores 145 formed in the closure member 142. It is to be noted that the bores 144 are larger in diameter than the shanks of the bolts 143, and the lengths of the bolts 143 are such that they bottom into the threaded bores 145, leaving clearance between the bolt heads 146 and the rear face of carrier 140, thus permitting comparatively free movement, within limits, of the closure member 142 relative to the carrier 140.

Limited movement of the valve seat relative to the closure member at or approximately at the moment of closure may also be provided by the constructions seen in FIG. 6 and 7. With reference first to FIG. 6, the valve body indicated generally at 222 is provided with an annular recess 224 receiving therein an O-ring 225, which serves to bias the valve seat into tight sealing relation with the closure member when the valve is in closed position, and also to seal against passage of pressure fluid past the valve when in closed position. The valve seat indicated generally at 230 inclues a central annular cylindrical portion 231, whose inner cylindrical face 232 is spaced outwardly by a slight clearance from the cylindrical face 233, which forms the radially inner wall of the annular cavity 224. At the downstream end of cylindrical portion 231, seat 230 is provided with a sealing portion, which as here shown in section appears as an inwardly extending arm 234, terminating inwardly in a sealing edge 235 directed downstream. When the valve is in closed position as seen in FIG. 6, edge 235 is in abutting sealing contact with an upstream-directed face 236 of the closure member 237. It will be understood that the latter member is pivotally connected to the valve body 222, and is actuated into open or closed positions by suitable toggle linkage, in the same manner as heretofore illustrated and described in connection with FIGS. 2 and 4. Sealing face 236 need not, however, be divergent downstream as in the FIG. 5 construction, and is desirably flat as shown, lying in a plane normal or virtually normal to the valve longitudinal axis when the closure member is in closed position.

It is to be particularly noted that the sealing arm 234 prevents a convex surface 238 to upstream pressure fluid, the sealing arm 234 being formed on a radius of curvature of from one inch to as much as three or four inches, depending upon the size of the valve itself and the magnitude of the pressures being sealed by the valve. The sealing edge 235 of the arm 234 is itself rounded on a comparatively small radius, in the range of about 0.002 to 0.005 inch in a typical application, so that any relative movement between the sealing edge 235 and the face 236 of the closure member 237 will not result in substantial wear or galling of the surface 236. It will thus be seen that pressure of upstream fluid exerted against the convex surface 238 of the arm 234 will tend to increase the force with which the sealing edge 235 is maintained in sealing contact with the face 236.

The valve seat 230 is also provided, on the upstream end of the cylindrical portion 231, with a radially outwardly extending flange 240, whose outer edge 241 is spaced inwardly by a radial clearance from the cylindrical wall 242, defining the outer extent of cavity 224. Flange 240 is in abutting relation with O-ring 225, and the valve seat itself is retained in position by a retainer nut indicated generally at 245 in threaded engagement at 246 with the downstream portion of the bore 242.

In FIG. 7 there is shown a modification of the sealing structure described in connection with FIG. 6, the form of the invention in FIG. 7 being particularly adapted for use where environmental conditions make desirable the use of all metal components in the seal. Within the cavity 224 is disposed metallic resilient means, here shown as a spring washer indicated generally at 248, being sinuously configured throughout its annular shape. The construction of FIG. 7 contemplates the provision of a valve seat indicated generally at 250, having a central annular cylindrical portion 251 whose inner cylindrical face 252 is spaced radially outwardly from the cylindrical bore 233 of the cavity 224. At the downstream end of cylindrical portion 251, valve seat 250 includes a sealing arm 254 terminating in a downstream-directed sealing edge 255 in abutting sealing contact with the upstream-directed face 236 of the closure member 237. As in the case of the sealing edge 235 described in connection with FIG. 6, sealing edge 255 is desirably rounded on a radius of from about 0.002 to about 0.005 inch, and the sealing arm 254 is formed to present a convex upstream face 258, whereby pressure of upstream fluid exerted against that convex face serves to increase the sealing force with which sealing edge 255 bears against the face 236 of the closure member. As in the embodiment of the invention shown in FIG. 6, valve seat 250 is retained in its cavity by a retainer nut indicated generally at 245 in threaded engagement at 246 with valve body 222.

Valve seat 250 is provided, at the upstream end of cylindrical portion 251, with an outwardly radially extending flange 260 in abutting contact with the spring washer 248, and radially outwardly of flange 260 is a sealing leg 262 extending annularly in an upstream direction from flange 260 and terminating outwardly in a sealing edge 263 in sealing contact with the bore 242 of valve body 222. Sealing edge 263 is desirably rounded on a radius from about 0.002 to about 0.005 inch, in order to minimize galling of the bore 242 with which the sealing edge is in sealing contact. It will be observed that the force of pressure fluid on the upstream side of valve seat 250 serves to bias the sealing leg 262 and its sealing edge 263 into sealing contact with bore 242.

Another form of the invention is seen in the sectional view of FIG. 11 and in FIGS. 12, 13 and 14 associated therewith. Specifically, the valve of FIG. 11 includes a valve body indicated generally at 300, providing a generally longitudinal passageway between an inlet end 302 and an outlet end 304, each of the latter having provision for threadedly or otherwise receiving conduits 306 and 308 respectively. In the present description it will be assumed that high pressure fluid exists in the inlet conduit 306, and hence in the inlet portion 302 of the valve body; however, it will be understood as the description progresses that the present valve is adapted to seal against pressure fluid existing in conduit 308 and valve body portion 304 also.

Within the body of valve 300, and intermediate the inlet and outlet ends 302 and 304 thereof, there is a chamber indicated generally at 310 in which a valve closure means indicated generally at 312 is movable about a pivotal mounting 314 between open and closed position, in substantially the same manner as the valve closure member 50 previously described in connection with FIGS. 2 and 4. As will be noted, the closure means 312 is shown in its closed position in FIG. 11, being maintained in that position by a toggle linkage mechanism indicated generally at 316 and corresponding to the linkage mechanism previously described in connection with FIGS. 2 and 3. Thus the link 317 corresponds functionally and structurally to link arm 62 seen in FIG. 2, link 317 being pivotally connected at its upper end to pivot pin 318. Centrally of the length of valve body 300 and extending upwardly from chamber 310 is a generally cylindrical housing indicated generally at 320, in which are carried the actuating means for the present valve, including an actuating rod 322 which may be vertically moved by suitable mechanism (not shown), such as that illustrated in FIG. 2 in connection with the form of the valve there shown.

Mounting of the pivot pins 314 and 318 in valve body 300 will be understood by reference to FIG. 12. As there shown, the inner generally cylindrical surface 330 of housing 320 is interrupted by two pairs of bosses 331, 332 and 333, 334. Pivot pin 314, on which the closure member of the present valve is mounted, is mounted in bores (see FIG. 14) 335, 336 formed in bosses 331, 332. Thus the pin extends between the two bosses, and in its central portion is rotatably engaged in bore 340 formed in a knuckle 341 attached to or formed integrally with the closure member 312 of the present valve.

With particular reference to FIG. 14, means are desirably provided to facilitate removal of the pivot pin 314 when such removal is desired in order ot repair or replace component parts of the present valve. Thus a threaded sealing plug indicated generally at 345 includes an enlarged head 346 having means such an O-ring 347 for sealing with the outer surface of the valve body when the plug 345 is tightened into place as shown. In order to assist in the withdrawal of the pivot pin 314 from its position seen in FIG. 14, there may be provided a coaxial threaded bore 350 in one end of the pivot pin, into which a threaded shank of a pull-out tool or extractor may be introduced during disassembly. Pivot pin 318 is mounted in the valve body in the same way as pivot pin 314 just described.

In FIG. 13 are shown the details of the sealing elements of the present valve. Thus closure means 312 includes a disc carrier 360 having fixed to its upstream face 362 two sealing elements, a downstream sealing element indicated generally at 364 and an upstream sealing element indicated generally at 366. Each of these sealing elements consists of a generally disc-shaped piece of sheet metal, such as stainless steel having a thickness of about 0.010 to 0.015 inch, and they are desirably welded or otherwise permanently affixed to the carrier 360 by means not involving apertures or other openings through the sealing elements; a peripheral weld 370 may thus be employed to maintain element 364 in attachment to the carrier 360, and a similar weld 372 may be employed to keep the upstream sealing element 366 in position relative to the downstream sealing element 364 and the carrier 360.

Sealing element 364 includes an outer lip 380 directed upstream and terminating in a peripheral sealing edge 382 in sealing contact with downstream face 383 of shoulder 384 formed in valve body 300. Sealing element 366 is provided with an in-turned or reentrant peripheral lip 385 terminating in a sealing edge 386 directed upstream and in sealing contact with downstream shoulder face 383 along a circular sealing line concentric with and inwardly of the line of contact of sealing edge 382 with the shoulder face.

It will be seen that downstream pressure, if any, exerted against lip 380 will tend to force sealing edge 382 into tight sealing contact with face 383, while upstream pressure similarly tends to force sealing edge 386 of lip 385 into such contact. If no downstream pressure is to be resisted, sealing element 364 may be omitted, and sealing member 366 may then be directly fixed to carrier 312 as by a peripheral weld.

Modifications and changes from the illustrative embodiments of the invention herein shown and described not substantially departing therefrom are intended to be embraced within the scope of the following claims.

I claim:

1. A high-pressure valve comprising:
   a longitudinally extending hollow body having opposed inlet and outlet ports and a chamber intermediate said ports;
   an annular valve seat at the upstream side of the chamber and defining said inlet port;
   a closure member provided with a sealing portion having an annular sealing edge;
   means pivotally mounting the member to the body for swinging movement of the member between an open position outwardly of the circle defined by the valve seat and a closed position wherein said sealing edge is directed upstream and forms an annular line of sealing contact with the valve seat,
   said sealing portion including a sheet metal disc having an outer reentrant portion terminating inwardly in said annular sealing edge and of a larger diameter than that of said edge;
   and actuating means for moving the closure member between open and closed positions, including means providing a mechanical advantage which increases as the closure member approaches closed position.

2. The invention as stated in claim 1 wherein said sealing portion includes a second sheet metal disc having an upstream directed lip terminating in a second annular sealing edge radially outwardly of said first named sealing edge.

References Cited

UNITED STATES PATENTS

| | | | |
|---|---|---|---|
| 1,001,130 | 8/1911 | Faller | 251—280 |
| 3,077,331 | 2/1963 | Burtis | 251—174 XR |
| 3,077,332 | 2/1963 | Burtis | 251—174 XR |
| 3,153,427 | 10/1964 | Burtis | 251—174 XR |
| 3,182,951 | 5/1965 | Spencer | 251—85 |
| 3,334,858 | 8/1967 | Hay | 251—298 XR |

FOREIGN PATENTS 1,261,204   4/1961   France.

BILLY S. TAYLOR, Primary Examiner

U.S. Cl. X.R.

251—280